R. H. TUDOR.
NOSE CLAMP FOR EYEGLASSES.
APPLICATION FILED JULY 5, 1916.

1,228,721. Patented June 5, 1917.

Witnesses

R. H. Tudor Inventor
by C. A. Snow & Co.
Attorneys

UNITED STATES PATENT OFFICE.

ROBERT HENDERSON TUDOR, OF ATLANTA, GEORGIA, ASSIGNOR OF ONE-FOURTH TO JAMES W. HUBBARD AND ONE-FOURTH TO WALTER N. BAKER, BOTH OF ATLANTA, GEORGIA.

NOSE-CLAMP FOR EYEGLASSES.

1,228,721.  Specification of Letters Patent.  Patented June 5, 1917.

Application filed July 5, 1916. Serial No. 107,648.

*To all whom it may concern:*

Be it known that I, ROBERT H. TUDOR, a citizen of the United States, residing at Atlanta, in the county of Fulton and State of Georgia, have invented a new and useful Nose-Clamp for Eyeglasses, of which the following is a specification.

The device forming the subject matter of this application is a means for assembling a pair of nose clamps with an eye glass frame, so that the nose clamps will conform properly to the nose of the wearer, the construction, at the same time, being such that the glasses cannot tilt with respect to the face of the wearer, after they have been engaged with the nose.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
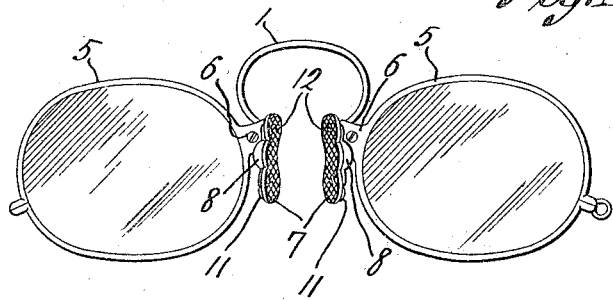
Figure 1 shows in rear elevation, a pair of nose glasses equipped with the device forming the subject matter of this application.
Figure 2:
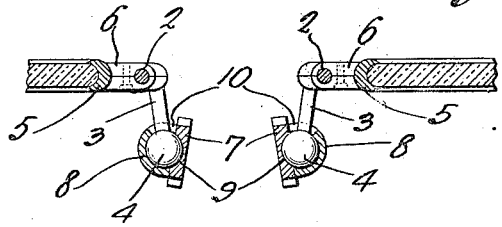
Fig. 2 is a fragmental longitudinal section of a pair of nose glasses comprising the present invention.
Figure 3:
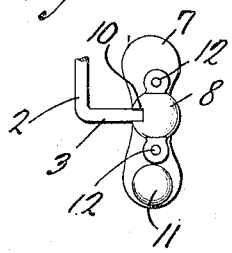
Fig. 3 is a fragmental view showing the outer face of the nose clamp.
Figure 4:
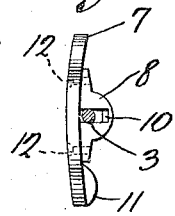
Fig. 4 is an elevation of the structure shown in Fig. 3, the finger of the nose spring appearing in section.
Figure 5:
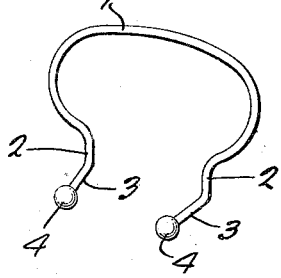
Fig. 5 is a perspective showing the nose spring.

In carrying out the present invention there is provided a spring 1 embodying arms 2 terminated in angularly disposed fingers 3 carrying balls 4.

In the present instance, but not of necessity, the frame of the eye glasses includes a pair of rims 5 having grips 6 engaging the arms 2 of the spring 1.

The numeral 7 indicates nose clamps to which are applied sockets 8 held in place by securing elements 12. In the clamps 7 are formed recesses 9 complemental to the sockets 8. The balls 4 coöperate with the recesses 9 and the sockets 8, the fingers 3 being mounted to move in slots 10 in the sockets 8, the slots 10 being disposed transversely of the nose clamps 7. The nose clamps 7 may be counterweighted adjacent their lower ends as shown at 11.

Because the nose clamps 7 are counterweighted as shown at 11, the clamps stand in approximately the positions shown in Fig. 1, and are positioned to be received readily on the nose of the wearer. Owing to the ball and socket connection 4—8, the nose clamps 7 will fit readily on the nose, irrespective of the slant of the nose either vertically or horizontally. In this connection, attention is directed to the slots 10 which extended transversely of the nose clamps 7. Owing to the specific location of the slots 10, the nose clamps 7 may tilt vertically, thus causing the clamps to conform to the vertical or up and down slope of the nose. The clamps 7 may also tilt in such a way as to conform to the side slope of the nose of the wearer, considered horizontally. However, since the fingers 3 are received in the slots 10, the eye glass frame as a whole, cannot tilt with respect to the face of the wearer, after the clamps 7 have been engaged with the nose, such a tilting being likely to take place, in the absence of the specific construction employed, if the head of the wearer is swung backwardly or forwardly.

When the wearer inclines his head forwardly, the weight of the eye glass frame tends to detach the frame from the nose. In order to obviate this result, the balls 4 must be disposed as close as possible to the side faces of the nose. It is with this end in view that the recesses 9 are fashioned in the nose clamps 7.

The utility of the structure is greatly enhanced, the construction is simplified, and a rigid connection is afforded because the balls 4 constitute an integral part of the spring 1, although this detail is not insisted upon.

Changes may be made without departing from the spirit of the invention and without sacrificing its utility. The rims 5 may be dispensed with, or, if they are used, templets may be added thereto. The specific form of counterweight shown at 11 may be departed from. Some other connection other than the grips 6 may be used, and, in general, the device is adapted to be employed in connection with glasses of any kind, calling for a ball and socket union of the type herein disclosed.

Having thus described the invention, what is claimed is:—

An eye glass frame embodying arms provided with balls; nose clamps; and sockets on the nose clamps and receiving the balls, the clamps having slots receiving the arms, the slots being elongated transversely of the nose clamps, thereby to prevent the frame from tilting forwardly and rearwardly, but to permit the clamps to have tilting movements in two directions, one of which is longitudinally of the nose of the wearer, the other of which is transversely of the nose of the wearer, thereby permitting the clamps to conform to both the vertical slope of the nose and to the horizontal slope of the nose.

In testimony that I claim the foregoing as my own, I have hereto affixed my signature in the presence of two witnesses.

ROBERT HENDERSON TUDOR.

Witnesses:
H. J. CARPENTER,
H. B. GEER.